US009297591B1

(12) United States Patent
von Hack-Prestinary et al.

(10) Patent No.: US 9,297,591 B1
(45) Date of Patent: Mar. 29, 2016

(54) HEAT CONDUCTION SYSTEMS

(71) Applicants: Richard von Hack-Prestinary, Orlando, FL (US); Raymond S. Donofrio, Sun City, AZ (US)

(72) Inventors: Richard von Hack-Prestinary, Orlando, FL (US); Raymond S. Donofrio, Sun City, AZ (US)

(*) Notice: Subject to any disclaimer, the term of this patent is extended or adjusted under 35 U.S.C. 154(b) by 404 days.

(21) Appl. No.: 13/666,931

(22) Filed: Nov. 1, 2012

Related U.S. Application Data

(60) Provisional application No. 61/554,425, filed on Nov. 1, 2011.

(51) Int. Cl.
*F24J 3/08* (2006.01)
*F28F 9/00* (2006.01)
*F28F 27/02* (2006.01)
*F28F 13/00* (2006.01)

(52) U.S. Cl.
CPC . *F28F 9/001* (2013.01); *F24J 3/08* (2013.01); *F28F 27/02* (2013.01); *F28F 2013/008* (2013.01)

(58) Field of Classification Search
CPC .......... F24J 3/06; F24J 3/08; F25B 30/06; F25B 2313/002; Y02E 10/10; Y02E 10/12; F28F 9/001; F28F 2255/00; F28F 2255/20; F28F 2013/001; F28F 2013/008; F28F 2013/006; F28F 27/02
USPC ......... 165/45, 185, 96, 277, 276; 62/260, 383
See application file for complete search history.

(56) References Cited

U.S. PATENT DOCUMENTS

| 2,930,407 | A | * | 3/1960 | Conley et al. ............... 138/114 |
| 3,229,755 | A | * | 1/1966 | Komarow ..................... 165/277 |
| 3,330,333 | A | * | 7/1967 | Moss ............................ 165/45 |
| 3,643,734 | A | * | 2/1972 | Deschamps .................. 165/96 |
| 5,077,103 | A | * | 12/1991 | Wagner et al. ............... 428/34.1 |
| 6,351,952 | B1 | * | 3/2002 | Baker, III ..................... 62/3.7 |
| 6,399,149 | B1 | | 6/2002 | Klett et al. |
| 6,404,636 | B1 | * | 6/2002 | Staggers et al. .............. 361/704 |
| 2003/0015811 | A1 | * | 1/2003 | Klett et al. .................... 264/29.6 |
| 2007/0295477 | A1 | * | 12/2007 | Mueller et al. ................ 165/45 |

OTHER PUBLICATIONS

Nika et al., Lattice thermal conductivity of graphene flakes: Comparison with bulk graphite, May 19, 2009, Applied Physics Letters 94, 203103, pp. 1-3.*

(Continued)

*Primary Examiner* — Marc Norman
*Assistant Examiner* — Jon T Schermerhorn
(74) *Attorney, Agent, or Firm* — Keith L. Jenkins, Registered Patent Attorney, LLC; Keith L. Jenkins

(57) ABSTRACT

A heat conduction system including modular pipes housing a solid heat conductor made of a combination of carbon foam glass and grapheme and, for conductors, insulated from the outermost pipe by an insulating layer and with an annular gas purging gap for high-temperature applications. Also included in the system are thermal valves, manifolds, and heat exchangers to route and use the thermal energy. In an exemplary use, a down-hole heat exchanger, thermally coupled to a string of heat conduction modules, brings geothermal heat up from abandoned oil wells to operate a boiler and steam turbine. In another exemplary use, waste heat is conducted out of slag for conversion into useful energy. In yet another exemplary use, waste heat is conducted away from a nuclear reactor.

20 Claims, 9 Drawing Sheets

(56) References Cited

OTHER PUBLICATIONS

Oak Ridge National Laboratory, "ORNL's Graphite Foam May Aid Transportation". Oak Ridge National Laboratory Review, vol. 33, Nov. 3, 2000. Shows graphitized carbon foam (last paragraph, first page) but not applicant's carbon foam/graphene combination.

Author unknown, PocoGraphite Flyer, PocoGraphite, Inc. 2008. Same product as above.

Yu, et al., "Carbon-foam Finned Tubes in air-water heat exchangers", Applied Thermal Engineering 26 (2006) pp. 131-143. Does not include graphene.

* cited by examiner

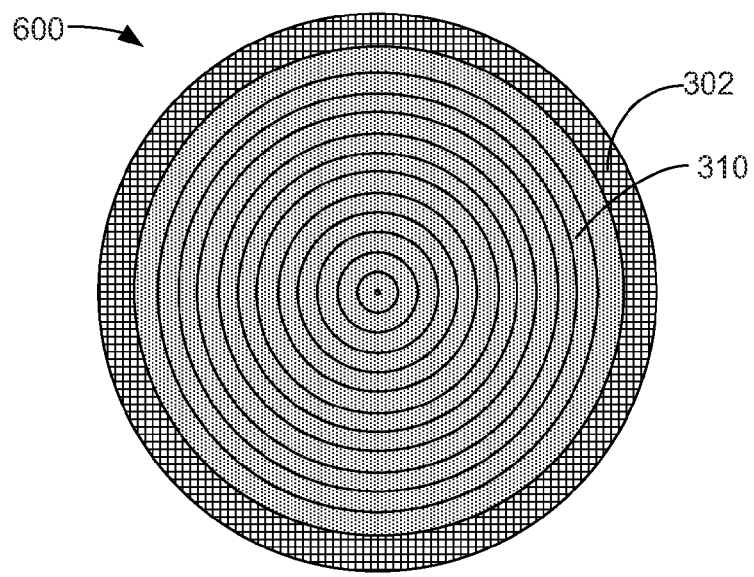
FIG. 6
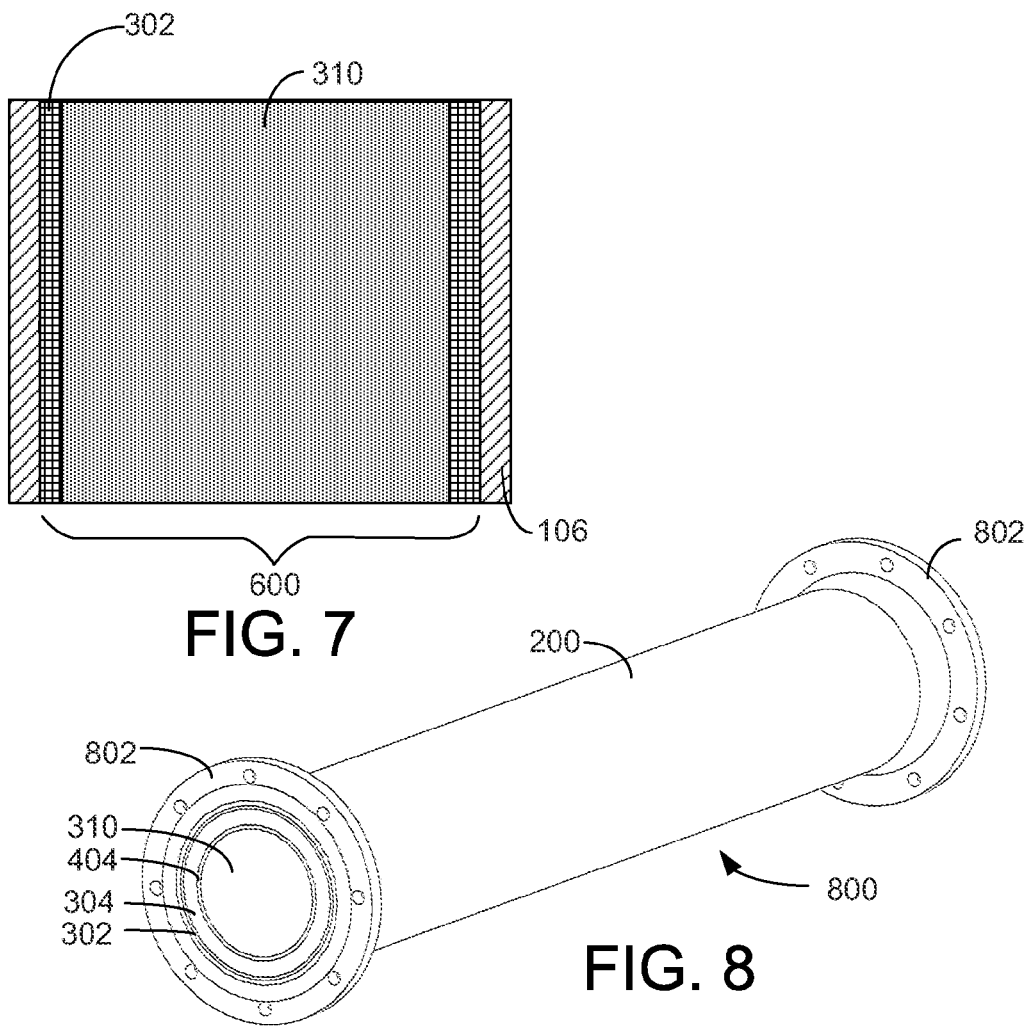
FIG. 7
FIG. 8

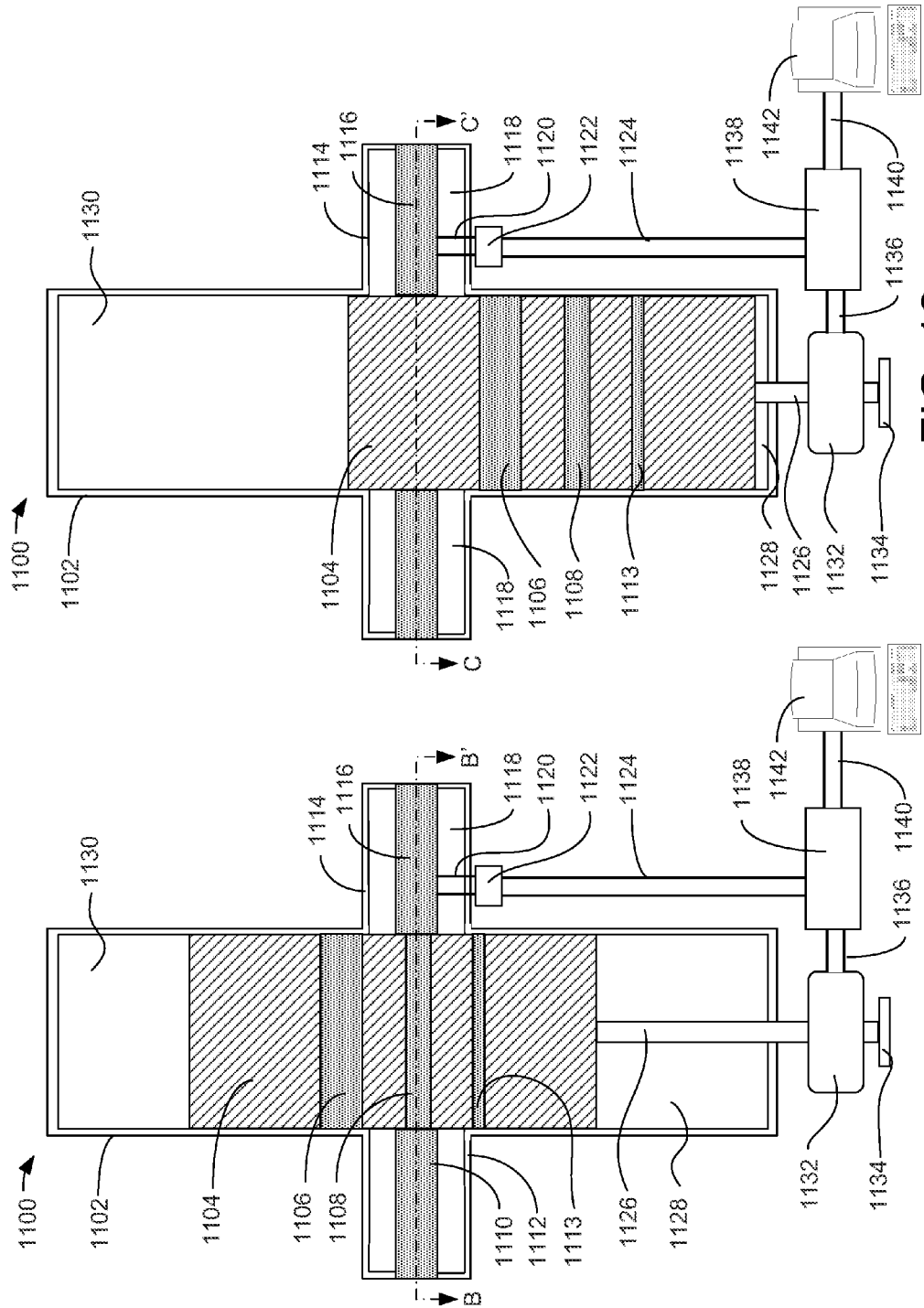

HEAT CONDUCTION SYSTEMS

RELATED APPLICATIONS

This application claims the benefit of U.S. provisional patent application 61/544,425 filed Nov. 1, 2011 to the same inventors.

FIELD OF THE INVENTION

This invention relates to heat conduction systems. More particularly, it relates to a non-fluid, or solid, heat conduction system. More particularly, it relates to a passive method for transferring heat using a zero-carbon footprint as far as the atmosphere is concerned.

BACKGROUND

A problem in extraction of geothermal energy and other isolated energy sources, such as nuclear power plants, has been that a heat-conductive fluid must first be pumped to the heat source, where the fluid is heated, then pumped back to a heat exchanger to be extracted for useful purposes or ejected. The cooled fluid output of the heat exchanger may be reused in some applications, or may be waste in other applications, but requires pumping in either case. The heat losses during pumping from the isolated heat source to the heat exchanger can be substantial, so only the hotter geothermal or other isolated sources are practical to use. With geothermal energy, this often requires adding the cost of drilling both a production well and an injection well to discharge expended geothermal fluids.

Therefore, a need exists for a heat conduction medium that does not require pumping.

OBJECTS AND FEATURES OF THE INVENTION

A primary object and feature of the present invention is to overcome the above-mentioned problems and fulfill the above-mentioned needs. Another object and feature of the present invention is to provide a solid heat conduction medium with reduced heat loss as compared to available heat conduction fluids. It is a further object and feature of the present invention to provide a solid heat conduction medium that is easy to install in pre-existing dry oil wells and geothermal wells in order to use the lower temperature geothermal energy (400-700 degrees Fahrenheit) in such wells. It is yet a further object and feature of the present invention to provide a heat conduction system comprising modular units of heat conductors, switches, and heat exchangers that can be easily assembled into various larger heat conduction systems. It is an additional primary object and feature of the present invention to provide such a system that is efficient, inexpensive and handy. Other objects and features of this invention will become apparent with reference to the following descriptions.

SUMMARY OF THE INVENTION

In accordance with a preferred embodiment hereof, this invention provides a novel solid-medium heat conduction system for conducting heat over substantial distances and extracting that heat for useful purposes. The system includes various connectable modules of internally insulated pipe having a core of a solid composition of carbon foam glass and graphene. Graphene is a single-layer of bonded carbon atoms in a hexagonal grid pattern. Heat transfer axially along the core is very rapid, whereas radial heat transfer is minimal, due to the lack of a significant radial thermal gradient as a result of the layer, or layers, of insulation between the pipe and the core.

A first type of module is a heat conduction module that includes pipe lined internally with a refractory insulator such as multi-layer silicon carbide, fibrous silica insulating ceramic composite, or aluminum oxide ceramic insulation material. Heat conduction modules are linear. The insulator may be composed of multiple layers of the same or various refractory insulating material or may be composed of a single refractory insulating material. Radially inward from the refractory insulator lining is a ceramic stand-off between the refractory insulator and the heat conductive core. The ceramic standoff provides space for purging air with chemically inert gas after installation and before system operation. Radially inward from the ceramic standoff is the heat conductive core made of carbon foam glass and graphene. The heat conduction module has male and female ends, such that a plurality of heat conduction modules may be connected together to form a longer heat conduction path. Heat conduction modules are preferably produced in discrete lengths for transportability and handling convenience. In a preferred embodiment, the diameter of the drill casing used for the outside wall of the heat conduction modules is selected to fit telescopically into existing well casings or product pipes in well casings. Heat conduction modules for installation above ground may have flanged ends for ease of handling and maintenance. Heat conduction modules for down hole installation have couplings that have no or very small radial extension outward from the pipe.

A second type of heat conduction module is a down-hole heat exchanger module, which may be similar to the linear heat conduction module, but without the refractory insulator and optionally without standoffs. This type of module is designed to receive heat from a thermal source, such as a geothermal source, conducting external heat into the heat conductive core for conduction through coupled heat conduction modules to an output heat exchanger. Down-hole heat exchanger modules are also made in discrete sizes and have male and female connector ends that can couple to heat conduction modules or other down-hole heat exchanger modules. At the bottom end of the down-hole heat exchanger, a heat-conductive end cap is used, preferably of a refractory metal alloy that is resistant to corrosion. Those of skill in the art, enlightened by the present disclosure, will appreciate that the heat conductivity of the rock strata or liquid medium in which the down-hole heat exchanger is installed will be a factor in the rate at which heat can be removed from the source, and will select the most conductive strata for installing the down-hole heat exchanger. Down hole heat exchangers have couplings that have no or very small radial extension outward from the pipe.

In heat conduction and down-hole heat exchange modules, the spaces created by the stand-offs, if used, may also be used to route signal paths from temperature sensors within the modules to a monitor or a controller at the surface.

A third type of module in the heat conduction system is a shutoff valve module. A valve physically and reconnectably disconnects the heat conductive core from one conduction path and may reconnect it another conductive path.

A fourth type of module in the heat conduction system is a manifold module, which distributes the heat output on a single input thermal conductor among two or more other conductive paths.

A fifth type of module in the heat conduction system is a thermal valve module, which accepts heat input by a first conductive path and reduces the output to a second conductive path, such as by aperture selection.

A sixth type of module in the heat conduction system is a heat conductive pipe bend module, which may be produced at various desirable angles. Cross-sectionally, the heat conductive pipe bend module is similar to the heat conduction module, allowing for the curvature of the heat conductive pipe bend module. Heat conductive pipe bend modules are primarily for creating conductive paths above the ground.

A seventh type of module in the heat conduction system is the top-side heat exchanger module, which may be as simple as a down-hole heat exchanger working in reverse due to the different temperature gradient, or as complex as any known type of heat exchanger. The various types of modules may be connected together to form conductive paths for bringing heat from a source to a destination.

Briefly, the invention provides, a heat conduction system including: a solid heat conducting core material including an ultrasonically blended and subsequently pyrolyzed combination of pitch, coal tar, and graphene and having first and second core ends; and an outer casing having first and second casing ends enclosing the heat conducting core material, where the casing provides thermal conduction access to at least the first and second core ends. The heat conduction system, further including a coupling on at least one of the first and second casing ends. The heat conduction system, further comprising thermally conductive minerals in said pyrolyzed combination. The heat conduction system, further including an insulating layer between the outer casing and the solid heat conducting core material. The heat conduction system, further including at least one circumferential spacer between the insulating layer and the solid heat conducting core material. The heat conduction system, where the at least one circumferential spacer includes at least two openings for purging with inert gas. The heat conduction system, where the first and second core ends include complimentary first and second non-flat surface configurations, respectively. The heat conduction system, where the outer casing includes a pipe having pipe couplings at the first and second casing ends and the solid heat conducting core material includes a cylinder within the pipe. The heat conduction system, where the outer casing includes: a manifold casing having a single input opening and a plurality of output openings; and couplings at distal ends of the input and output openings, able to couple to other elements of the heat conduction system; and the solid heat conducting core material includes a plurality of output thermal conduits, equal in number to the plurality of output openings, within the manifold casing and extending from an input thermal conduit. The heat conduction system, where the outer casing includes a shutoff valve casing having: shutoff valve input and output channels; a first chamber not aligned to the shutoff valve input and output channels; a lower chamber aligned to the shutoff valve input and output channels; and couplings at distal ends of the shutoff valve input and output channels, able to couple to other elements of the heat conduction system; and the solid heat conducting core material includes: the solid heat conducting core material extending within the shutoff valve input and output channels; and a block moveable between the upper and lower chambers. The heat conduction system, where: the outer casing includes a thermal valve casing having: thermal valve input and output channels; a housing having an upper chamber and a lower chamber; and couplings at distal ends of the input and output channels, able to couple to other elements of the heat conduction system; the housing houses a moveable disc able to be controllably moved within the upper and lower chambers, where the disc includes a plurality of apertures of various sizes, each able to be selectively aligned to the input and output channels via the controlled movement of the disc; and the solid heat conducting core material extends through each aperture of the plurality of apertures and extends within the thermal valve input and output channels. The heat conduction system, where: the outer casing includes a down-hole heat exchanger casing having: a down-hole heat exchanger output channel; and a coupling at a top end of the output channel, able to couple to other elements of the heat conduction system; the solid heat conducting core material includes either the solid heat conducting core material in thermal communication with the outer casing or the solid heat conducting core material extending beyond the outer casing. The heat conduction system, including a plurality of coupled outer casings enclosing the solid heat conducting core material, where each coupled outer casing enclosing the solid heat conducting core material is configured as either a heat conduction module; a pipe break heat conduction module; a pipe bend module; a heat conduction shut-off valve module; a heat conduction thermal valve module; a heat conduction manifold module; an input heat exchanger module; or an output heat exchanger module; and the plurality of coupled outer casings enclosing the solid heat conducting core material is able to receive an input of heat from a heat source in thermal communication with the input heat exchanger and to conduct the heat to the output heat exchanger. The heat conduction system, where the heat source in thermal communication with the input heat exchanger module is geothermal; hot slag; industrial waste heat; solar; and/or a nuclear reactor.

A heat conduction system including: a solid heat conducting core material including an ultrasonically blended and subsequently pyrolyzed combination of pitch, coal tar, and graphene and having first and second core ends; and an outer casing having first and second casing ends enclosing the heat conducting core material, where the casing provides thermal conduction access to at least the first and second core ends; and a coupling on at least one of the first and second casing ends. The heat conduction system, further comprising thermally conductive minerals in said pyrolyzed combination. The heat conduction system, further including: an insulating layer between the outer casing and the solid heat conducting core material; at least one circumferential spacer between the insulating layer and the solid heat conducting core material; at least two openings in said at least one circumferential spacer for purging with inert gas; and where the first and second core ends include complimentary first and second non-flat surface configurations, respectively. The heat conduction system, further including either the solid heat conducting core material in thermal communication with the outer casing or the solid heat conducting core material extending outside of the outer casing. The heat conduction system, comprising a plurality of coupled modules, wherein each module of said plurality of coupled modules comprises said outer casing enclosing said solid heat conducting core material, where: each module of the plurality of coupled modules is configured as either a heat conduction module; a pipe break heat conduction module; a pipe bend module; a heat conduction shut-off valve module; a heat conduction thermal valve module; a heat conduction manifold module; an input heat exchanger module; or an output heat exchanger module; and the plurality of coupled modules is able to receive an input of heat from a heat source in thermal communication with the input heat exchanger and to conduct the heat to the output heat exchanger. The heat conduction system, where the heat source in thermal communication with the input heat exchanger module is geothermal; hot slag; industrial waste heat; solar; and/or a nuclear reactor.

A heat conduction system including: a solid heat conducting core material including an ultrasonically blended and subsequently pyrolyzed combination of pitch, coal tar, and graphene and having first and second core ends; and an outer casing having first and second casing ends enclosing the heat conducting core material, where the casing provides thermal conduction access to at least the first and second core ends; and a coupling on at least one of the first and second casing ends; further including either a heat conducting module including: an insulating layer between the outer casing and the solid heat conducting core material; at least one circumferential spacer between the insulating layer and the solid heat conducting core material; at least two openings in the at least one circumferential spacer for purging with inert gas; and where the first and second core ends include complimentary first and second non-flat surface configurations, respectively; or a heat exchanger module further including either the solid heat conducting core material in direct thermal communication with the outer casing; and/or the solid heat conducting core material extending outside of the outer casing. The heat conduction system, further comprising thermally conductive minerals in said pyrolyzed combination. The heat conduction system, including a plurality of coupled modules, each module of the plurality of coupled modules including the outer casing enclosing the solid heat conducting core material, where each the module of the plurality of coupled modules is configured either a heat conduction module; a pipe break heat conduction module; a pipe bend module; a heat conduction shut-off valve module; a heat conduction thermal valve module; a heat conduction manifold module; an input heat exchanger module; and an output heat exchanger module; the plurality of coupled modules is able to receive an input of heat from a heat source in thermal communication with the input heat exchanger and to conduct the heat to the output heat exchanger; and where the heat source includes geothermal; hot slag; industrial waste heat; solar; and/or a nuclear reactor.

BRIEF DESCRIPTION OF THE DRAWINGS

The above and other objects and advantages of the present invention will become more apparent from the following description taken in conjunction with the following drawings in which:

FIG. 6 is an end view illustrating an exemplary down-hole heat exchanger module of an exemplary heat conduction system, according to a preferred embodiment of the present invention;

FIG. 7 is a cross-sectional view illustrating an exemplary down-hole heat exchanger module of an exemplary heat conduction system in a well pipe, according to a preferred embodiment of the present invention, as shown in FIG. 6;

FIG. 8 is a perspective view illustrating an exemplary heat conduction module, with flanged ends, of an exemplary heat conduction system, according to a preferred embodiment of the present invention;

FIG. 11 is a diagrammatic view illustrating an exemplary thermal valve of an exemplary heat conduction system, with the valve in a first position and defining cross-section BB" according to a preferred embodiment of the present invention;

FIG. 12 is a diagrammatic view illustrating an exemplary thermal valve of an exemplary heat conduction system, with the valve in a second position, and defining cross section CC' according to a preferred embodiment of the present invention;

DETAILED DESCRIPTION OF THE BEST MODES AND PREFERRED EMBODIMENTS OF THE INVENTION

Figure 1:
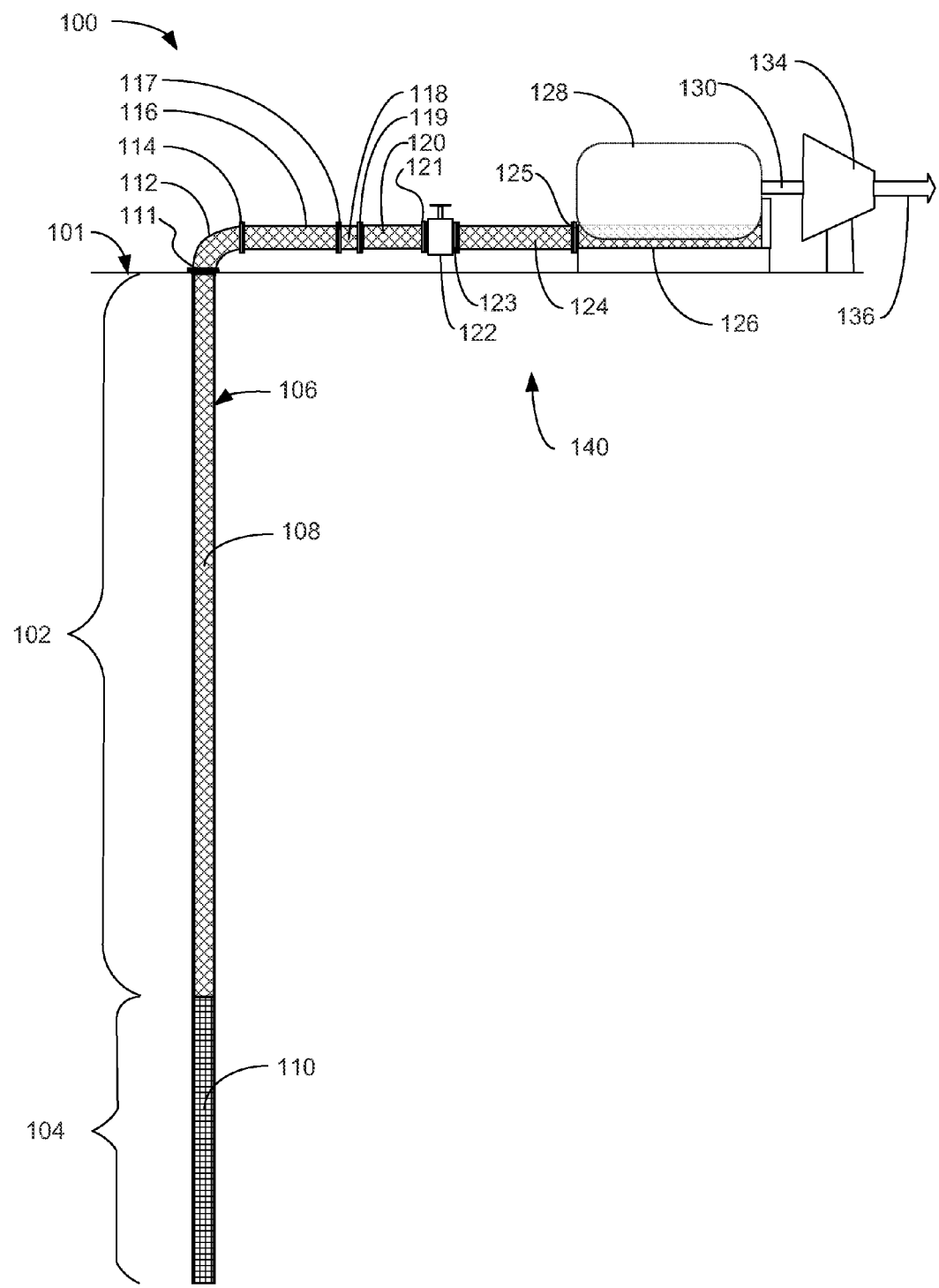
FIG. 1 is a diagrammatic view of a geothermal application of an exemplary embodiment of the heat conduction system, according to a preferred embodiment of the present invention.

FIG. 1 is a diagrammatic view of a geothermal application of an exemplary embodiment of the heat conduction system 100, according to a preferred embodiment of the present invention. Heat conduction system 100 is installed in a well pipe 106 below the surface 101 of the Earth. Heat conduction system 100 includes a down-hole heat exchanger portion 110 in geothermally active zone 104, an internally insulated heat conduction portion 108 in geothermally less active zone 102, and a top-side installation 140.

Exemplary top side installation 140 includes a heat conduction pipe bend module 112, a first heat conduction module 116; a pipe break heat conduction module 118, a second heat conduction module 120, a heat conduction shut-off valve 122, and a third heat conduction module 124. Exemplary top side installation 140 also includes a topside, or output, heat exchanger 126, which is illustrated as a bed of heat-conducting combination of carbon foam glass and graphene abutting a boiler 128. Boiler 128 produces steam that is conducted 130 to turbine 134 producing power 136.

Pipe bend module 112 is shown as a right angle bend, but the invention is not so limited. Pipe bend module 112 exemplifies that heat conduction modules of the present invention can be curved, and all manner of simple and compound curves are within the scope of the invention, including branches from such curved modules. With complex or sharp curves, the casing for the pipe bend module 112 may be made in more than one piece and fastened together. In particular embodiments, the curvature of a down-hole pipe bend module 112 (no flanges) may be quite gradual, adaptive to legacy well holes with curvature.

Heat conduction modules 112, 116, 118, 122, 124, and 126 are connected by flanges 111, 114, 117, 119, 121, 123, and 125, which provide ease of assembly and maintenance for top side installation 140. Inside the well pipe, flanges should be avoided or minimized. One factor influencing the rate of heat extraction by the heat conduction system 100 is the diameter of the heat-conducting core of both the down-hole heat exchanger portion 110 and the heat conducting portion 108. Given a well pipe 106 of a fixed diameter, the less of the diameter taken up by flanges, the more diameter can be used for heat-conducting core, and so the greater the rate of heat extraction. Accordingly, threaded couplings are preferred for strings of heat conduction modules 108 and down-hole heat exchanger modules 110 that are inserted into the well. Various threaded couplings, as are known in the art, may be used.

First heat conducting module 116, second heat conducting module 120, and third heat conducting module 124 are provided to show that different lengths of heat conducting modules may be produced and used. Preferably, the lengths are standardized. It is also a feature of the present invention that heat conducting modules 108, 116, 120, and 124 and down-hole heat exchanger modules in portion 110 may be made of various diameters to fully use various available well pipe 106 sizes. Top side heat exchanger 126 is illustrated as a bed of combined carbon foam glass and graphene heat conducting material abutting the boiler 128 surface, but the invention is not so limited. Any known design of heat exchanger in which the hot fluid side is replaced with heat conducting modules of the present invention will suffice. Likewise, turbine 134 is not limiting, but merely exemplary, as various devices for converting steam into useful power are known.

The first heat conducting module 116, second heat conducting module 120, and third heat conducting module 124, (each a linear heat conduction module), as well as all other heat conducting elements of the present invention, have a heat conducting core of carbon foam glass combined with graphene. The carbon foam glass and graphene heat conducting material 310 (see FIG. 3) is made from a combination of pitch, coal tar, and graphene that is ultrasonically blended for about 12 hours and cooked, or pyrolyzed, at a temperature range of 1700-1800 degrees Centigrade in a closed container. A foaming agent, surfactant, and/or a catalyst may be blended into the mixture. The process creates an open-cell carbon glass foam that has integral graphene as well as surface coatings of graphene in the open cell structure. The carbon foam glass and graphene heat conducting material 310 is an extremely rapid conductor of heat. For particular applications, thermally conductive minerals such as diamond, corundum, hematite, spinel, and/or pyrite, may be added to the mixture and pyrolyzed along with the pitch, coal tar, and graphene. Particular formulations may vary responsive to the heat source and other operating environmental factors.

Figure 2:
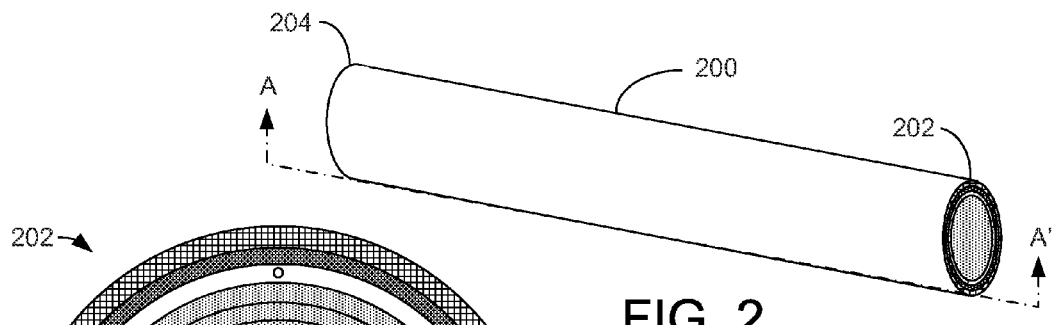
FIG. 2 is a perspective view illustrating an exemplary heat conduction module of an exemplary heat conduction system and defining cross section AA', according to a preferred embodiment of the present invention.

FIG. 2 is a perspective view illustrating an exemplary heat conduction module 200 of an exemplary heat conduction system 100 and defining cross sections AA' and EE', according to a preferred embodiment of the present invention. Exemplary linear heat conduction module 200 has a male end 202 and a female end 204, enabling assemblers to connect any number of heat conduction modules 200 to create a long conductive path.

Figure 3:
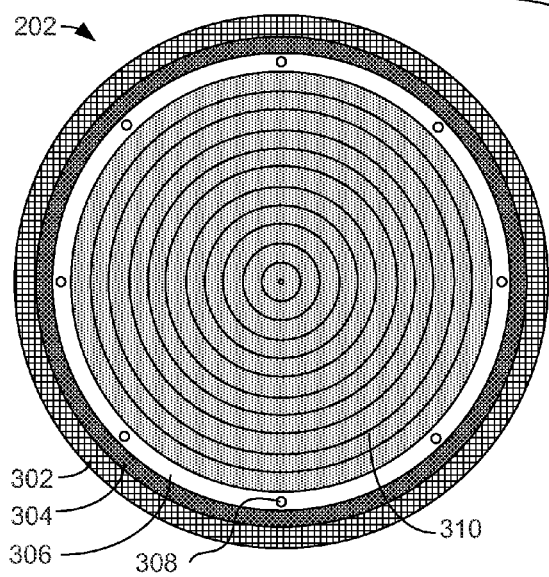
FIG. 3 is an end view illustrating an exemplary heat conduction module of an exemplary heat conduction system, according to a preferred embodiment of the present invention, as shown in FIG. 2.

FIG. 3 is an end view illustrating an exemplary male end 202 of an exemplary heat conduction module 200 of an exemplary heat conduction system 100, according to a preferred embodiment of the present invention, as shown in FIG. 2. Casing 302 provides structural support and resistance to handling and installation damage for the inner structures, including the inner insulating layer, or liner 304, the core support ring 306, and the carbon foam glass/graphene core 310. Core support ring 306 acts as a circumferential spacer, or support, for the core 310. Core support ring 306 has perforations 308 (one of eight labeled) that allow inert gas purging for high-temperature applications. Carbon foam glass/graphene 310 deleteriously reacts with atmospheric oxygen above 400° C. and so purging with an insert gas such as Argon or Helium is required for applications above that temperature. Carbon foam glass/graphene 310 is an open-cell foam, and so air enters the carbon foam glass/graphene 310 during manufacture and assembly. In high-temperature applications, purge gas fittings (not shown) are provided on some heat conduction modules 112, 116, 120, 124, and 200.

Casing 302 may be metal, such as well pipe, ceramic, or other substantially rigid and impact resistant material. Inner insulating liner 304 should be rigid and refractory insulation, such as, multi-layer silicon carbide, fibrous silica insulating ceramic composite, or aluminum oxide ceramic insulation material. The inner insulating liner 304 may be composed of multiple layers of the same or various refractory insulating material or may be composed of a single refractory insulating material.

Figure 4:
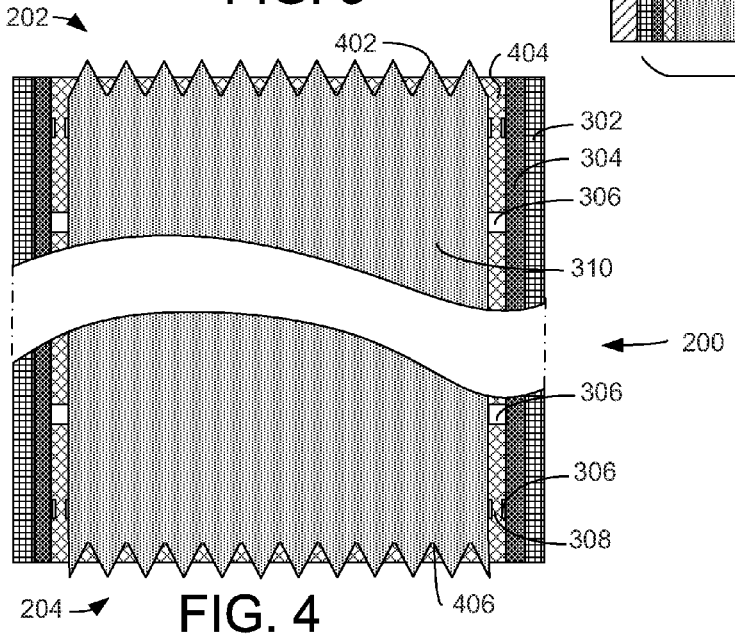
FIG. 4 is a cross-sectional view along cross-section AA' illustrating an exemplary heat conduction module of an exemplary heat conduction system, according to a preferred embodiment of the present invention, as shown in FIG. 2.

FIG. 4 is a cross-sectional view along cross-section AA' illustrating an exemplary heat conduction module 200 of an exemplary heat conduction system 100, according to a preferred embodiment of the present invention, as shown in FIG. 2. Purge gap 404 between the carbon foam glass/graphene core 310 and the inner insulating liner 304 houses core support rings 306 two of which are shown with perforations aligned to the cross-section AA' and two of which are shown otherwise aligned. Core support rings 306 are preferably made of an insulating material. The number of core support rings 306 in any application will depend on the overall design, with the weight of the carbon foam glass/graphene core 310 being a factor. Preferably, the core support rings 306 provide support for the carbon foam glass/graphene core 310 in any orientation, in order to prevent sliding within the casing 302. In particular applications using very long vertical strings of heat conduction modules 200, an insulating retaining ring (not shown) that directly supports the outer periphery of the carbon foam glass/graphene core 310, may be used to prevent the weight of the upper cores from compressing the lower cores.

Male end 202 is illustrated as having a series of nested circumferential protrusions 402 (one of eleven labeled) corresponding to the female end 204 which has a series of nested circumferential grooves 406 (one of eleven labeled). Various male/female patterns may be used, as long as they are consistent throughout the heat conduction system 100. For example, rather than appearing triangular in cross-section, the grooves and protrusions may be sinusoidal.

Figure 5:
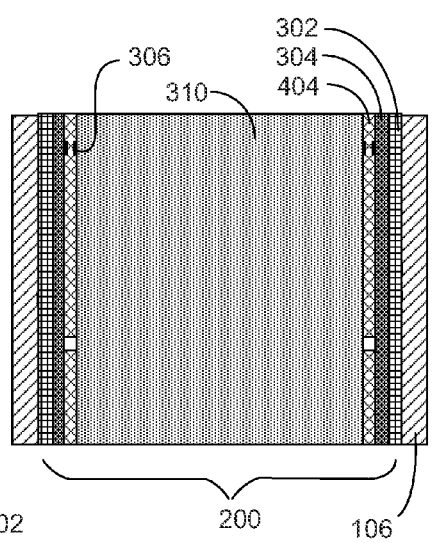
FIG. 5 is a cross-sectional view illustrating an exemplary heat conduction module of an exemplary heat conduction system in a well pipe, according to a preferred embodiment of the present invention, as shown in FIG. 2.

FIG. 5 is a cross-sectional view illustrating an exemplary heat conduction module 200 of an exemplary heat conduction system 100 in a well pipe 106, according to a preferred embodiment of the present invention, as shown in FIG. 2. Minimizing any gap between the well pipe 106 and the heat conduction module 200 allows maximizing the diameter of the carbon foam glass/graphene core 310.

FIG. 6 is an end view illustrating an exemplary down-hole heat exchanger module 600 of an exemplary heat conduction system 100, according to a preferred embodiment of the present invention. The carbon foam glass/graphene core 310 extends to the casing 302 in an embodiment for temperatures below 400° C. For an embodiment for higher temperatures, gap 404 (see FIG. 4) would be present for purging and core support rings 306 would be made of a thermally conductive material.

FIG. 7 is a cross-sectional view illustrating an exemplary down-hole heat exchanger module 600 of an exemplary heat conduction system 100 in a well pipe 106, according to a preferred embodiment of the present invention, as shown in FIG. 6. Contact with the well pipe 106 is desirable for heat exchange were the hot zone 104 environment requires containing the down-hole heat exchanger module 600 inside the well pipe.

FIG. 8 is a perspective view illustrating an exemplary heat conduction module 200, with flanged 802 ends, of an exemplary heat conduction system 100, according to a preferred embodiment of the present invention. Flanges 802 improve convenience of assembly and maintenance for the top side installation 140, but are preferably not used for down-hole couplings.

Figure 9:
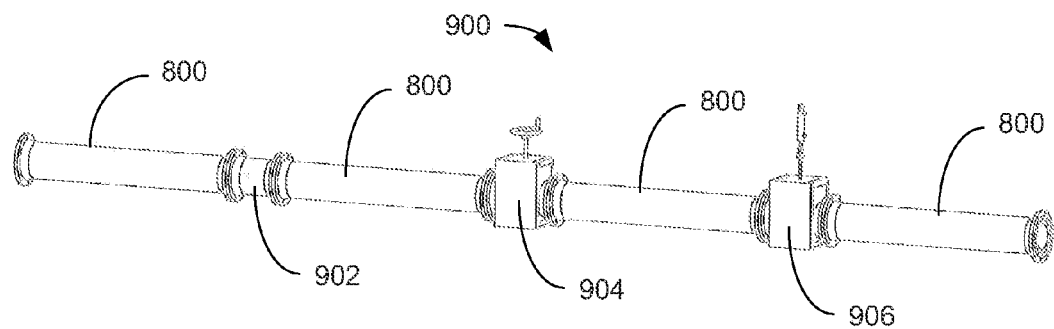
FIG. 9 is a perspective view illustrating a coupled sequence of an exemplary heat conduction modules with flanged ends and valves of an exemplary heat conduction system, according to a preferred embodiment of the present invention.

FIG. 9 is a perspective view illustrating a coupled sequence 900 of exemplary heat conduction modules with flanged ends 800 and valves 904 and 906 of an exemplary heat conduction system, according to a preferred embodiment of the present invention. Valve 904 is a manually operated shutoff valve and valve 906 is a hydraulically actuated shutoff valve. Heat conduction module 902 is a pipe-break module 902 which can be removed for maintenance to turn off the flow of heat cold-ward of the break.

Figure 10:
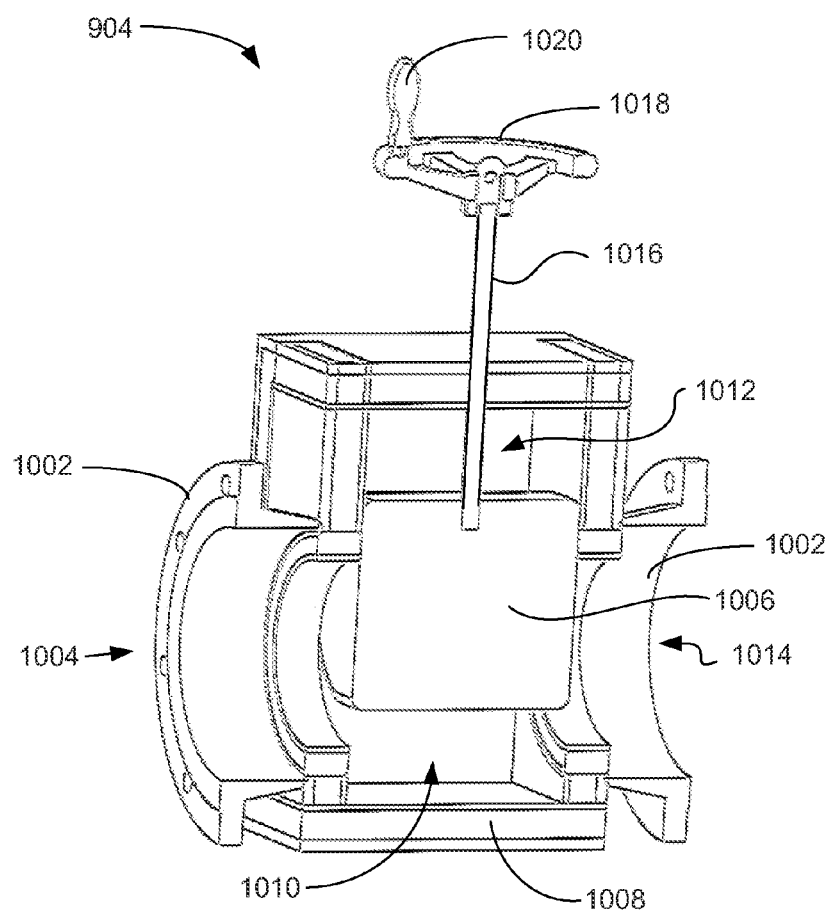
FIG. 10 is a cutaway perspective view of an exemplary shutoff valve of an exemplary heat conduction system, according to a preferred embodiment of the present invention.

FIG. 10 is a cutaway perspective view of an exemplary shutoff valve 904 of an exemplary heat conduction system 100, according to a preferred embodiment of the present invention. In operation, channels 1004 and 1014 would be filled with carbon foam glass/graphene core 310 within at least an inner insulating liner 304, which are omitted in the illustration for clarity. Carbon foam glass/graphene block 1006 is moveable up into upper chamber 1012 or down into lower chamber 1010 within housing 1008. In the down position, carbon foam glass/graphene block 1006 thermally connects the carbon foam glass/graphene cores 310 in channels 1004 and 1014 to enable thermal transfer through the shutoff valve 904. In the up position, carbon foam glass/graphene block 1006 mechanically disconnects the carbon foam glass/graphene cores 310 in channels 1004 and 1014 to disable thermal transfer through the shutoff valve 904. Shutoff valve 904 is manually operated via a handle 1020 on a crank 1018 that may be used to drive screw 1016. Shutoff valve 906 has similar internal workings but is hydraulically operated for systems were automatic controls are preferred.

FIG. 11 is a diagrammatic view illustrating an exemplary thermal valve 1100 of an exemplary heat conduction system 100, with the thermal valve 1100 in a first position and defining cross-section BB', according to a preferred embodiment of the present invention. Input carbon foam glass/graphene core 1110 may be connected to output carbon foam glass/graphene core 1116 through carbon foam glass/graphene conduit 1106, carbon foam glass/graphene conduit 1108 (as shown), or carbon foam glass/graphene conduit 1113, which are conduits through insulating disk 1104. Insulating disk 1104 moves up or down in insulated housing 1102 between top chamber 1130 and bottom chamber 1128 as actuated by valve stem 1126, which may be a screw-type valve stem 1126. Carbon foam glass/graphene conduits 1106, 1108, and 1113 have different diameters, or apertures, and so the smaller carbon foam glass/graphene conduits 1108 and 1113 reduce the heat that may be transferred across the thermal valve 1100 as compared with carbon foam glass/graphene conduit 1106, which provides full transfer. At top most or bottom-most positions (see FIG. 12), no carbon foam glass/graphene conduits 1106, 1108, or 1113 are aligned between the input carbon foam glass/graphene core 1110 and output carbon foam glass/graphene core 1116, and so the thermal valve 1100 may act as a shutoff valve 1100. Input carbon foam glass/graphene core 1110 and output carbon foam glass/graphene core 1116 are insulated by insulation 1118 within input housing 1112 and 1114, respectively.

Valve stem 1126 may be driven by motor 1132 that may be manually overridden with crank 1134. Motor 1132 is preferably operated by microcontroller 1138 over signal path 1136, based on signals from temperature sensor 1122 received over signal path 1124. Temperature sensor 1120 senses temperature of the output carbon foam glass/graphene core 1116 via temperature probes 1120. Micro controller 1138 is preferably slaved to computer 1142 via signal path 1140. Signal paths 1136, 1124, and 1140 are illustrated as paired lines, but any type of signal path, including wireless, may suffice.

FIG. 12 is a diagrammatic view illustrating an exemplary thermal valve 1100 of an exemplary heat conduction system 100, with the thermal valve 1100 in a second position, and defining cross section CC' according to a preferred embodiment of the present invention. In the illustrated position, heat transfer between the input carbon foam glass/graphene core 1110 and output carbon foam glass/graphene core 1116 is prevented. In various alternate embodiments, disk 1104 may be provided with more or fewer conduits 1106, 1108, and 1113.

Figure 13:
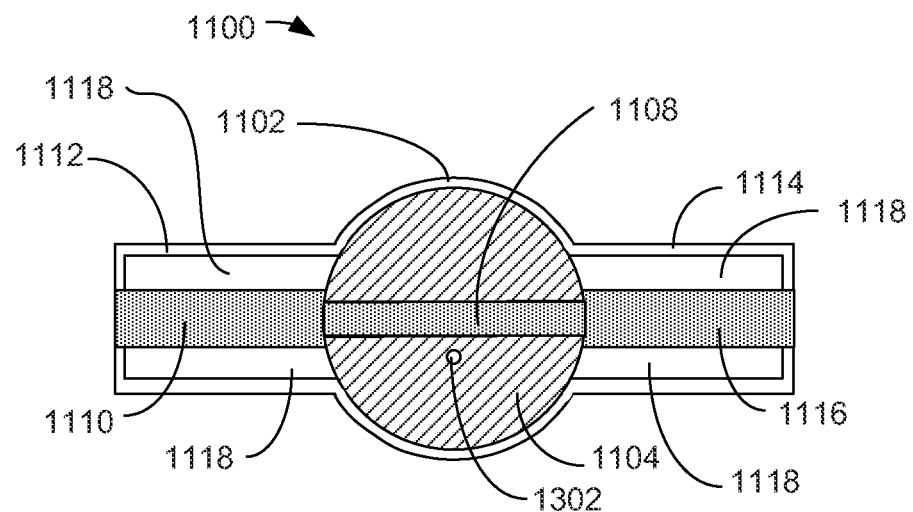
FIG. 13 is a diagrammatic view through cross section BB' illustrating an exemplary thermal valve of an exemplary heat conduction system, with the valve in a first position, according to a preferred embodiment of the present invention, as shown in FIG. 11.

FIG. 13 is a diagrammatic view through cross section BB' illustrating an exemplary thermal valve 1100 of an exemplary heat conduction system 100, with the thermal valve 1100 in a first position, according to a preferred embodiment of the present invention, as shown in FIG. 11. The input carbon foam glass/graphene core 1110 is thermally coupled to output carbon foam glass/graphene core 1116 via reduced-aperture carbon foam glass/graphene conduit 1108. Opening 1302 though disk 1104 assists in avoiding pressure differences between the top chamber 1130 and the bottom chamber 1128 as the disk 1104 moves.

Figure 14:
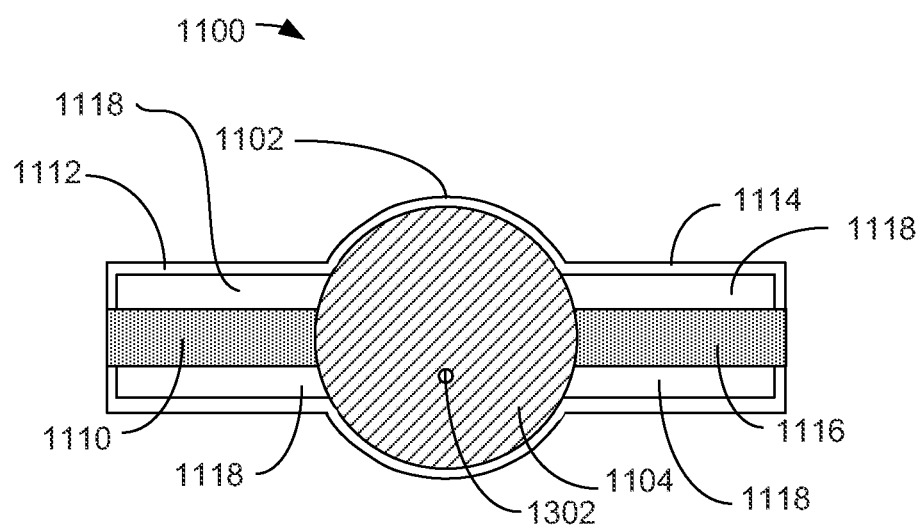
FIG. 14 is a diagrammatic view through cross section CC' illustrating an exemplary thermal valve of an exemplary heat conduction system, with the valve in a second position, according to a preferred embodiment of the present invention, as shown in FIG. 12.

FIG. 14 is a diagrammatic view through cross section CC' illustrating an exemplary thermal valve 1100 of an exemplary heat conduction system, with the thermal valve 1100 in a second position, according to a preferred embodiment of the present invention, as shown in FIG. 12. The input carbon foam glass/graphene core 1110 is thermally disconnected to output carbon foam glass/graphene core 1116 via insulating disk 1104.

Figure 15:
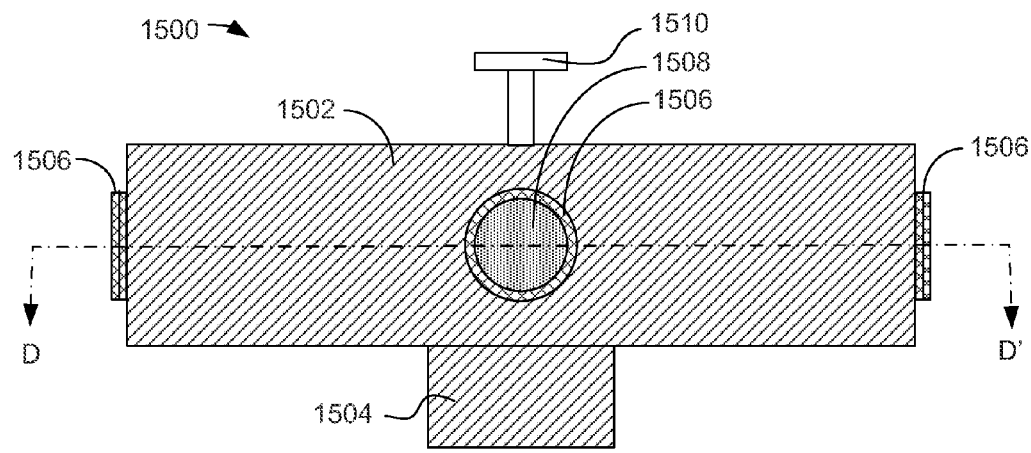
FIG. 15 is a side elevation diagrammatic view illustrating an exemplary heat manifold of an exemplary heat conduction system, according to a preferred embodiment of the present invention.

FIG. 15 is a side elevation diagrammatic view illustrating an exemplary heat manifold 1500 of an exemplary heat conduction system 100, according to a preferred embodiment of the present invention. Heat enters the manifold 1500 through carbon foam glass/graphene conduit 1610 (See FIGS. 16 and 17) within insulating manifold input 1504. Carbon foam glass/graphene conduit 1610 thermally couples with a plurality (four illustrated in FIGS. 15-17) spoke conduits 1606 to distribute the input heat to the plurality of manifold outputs 1508. Manifold housing 1502 is preferably of an insulating material lined with a low-friction insulating material 1604. Flanges 1506 surround each output 1508 to aid in connecting additional modules. Manual crank 1510 enables manual rotation of an internal distribution wheel 1602 (see FIG. 16) which can connect or disconnect heat transfer to the outputs 1508.

Figure 16:
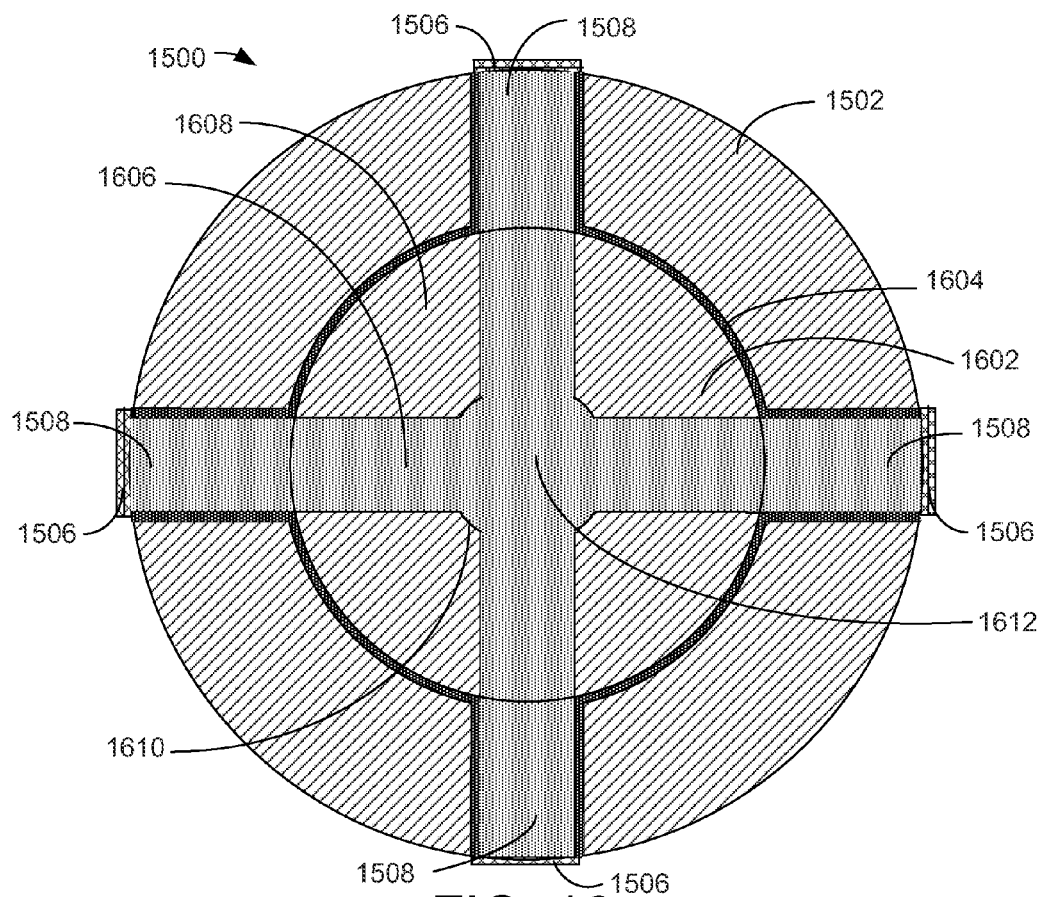
FIG. 16 is a cross-sectional view through cross section DD' illustrating an exemplary heat manifold of an exemplary heat conduction system, according to a preferred embodiment of the present invention, as shown in FIG. 15.

FIG. 16 is a cross-sectional view through cross section DD' illustrating an exemplary heat manifold 1500 of an exemplary heat conduction system 100, according to a preferred embodiment of the present invention, as shown in FIG. 15. Internal distribution wheel 1602 is shown with its carbon foam glass/graphene spokes 1606 (one of four labeled) aligned to the carbon foam glass/graphene outputs 1508. Carbon foam glass/graphene conduit 1610 connects to carbon foam glass/graphene spokes 1606 at the center of internal distribution core 1602. Internal distribution core 1602 is preferably made of an insulating material, such as the material used for housing 1502.

In a preferred embodiment, the input heat is supplied to four outputs 1508 to supply four loads (not shown). In a second preferred embodiment, there is only one carbon foam glass/graphene spoke 1606 and it can be switched using crank 1510 to any one of four outputs 1508. In a third preferred embodiment, there are two aligned carbon foam glass/graphene spokes 1606 that can be rotated to cut off one thermally conductive path and connect a second thermally conductive path. In a fourth preferred embodiment, there are only two carbon foam glass/graphene spokes 1606 at right angles that can provide heat to any two adjacent outputs 1508. In a fifth preferred embodiment, there are only three carbon foam glass/graphene spokes 1606 that provide heat to any three adjacent outputs 1508. In various additional embodiments, greater numbers of carbon foam glass/graphene spokes 1606 and outputs 1508 may be used. In a particular embodiment, unused outputs 1508 may be capped off with an insulating cap (not shown).

Figure 17:
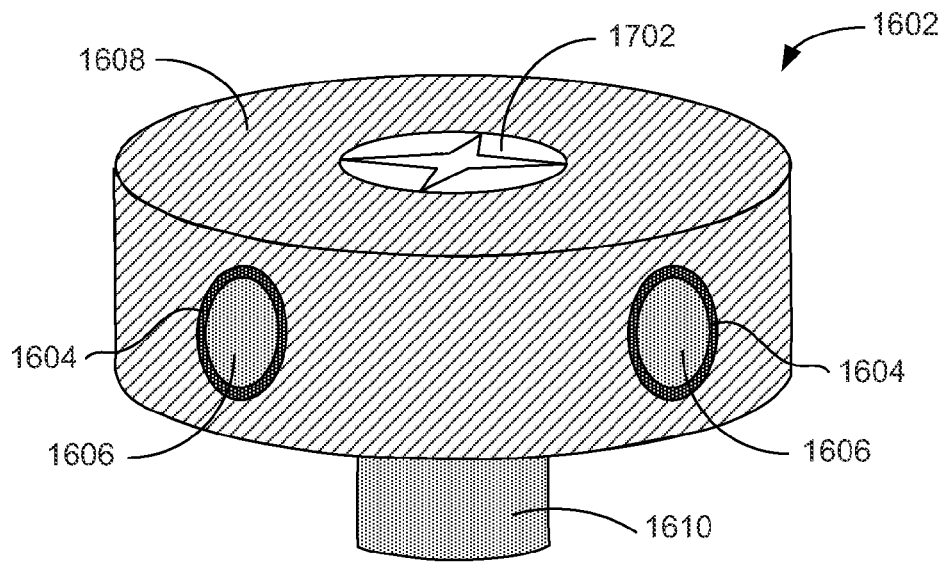
FIG. 17 is a perspective view illustrating an exemplary core of an exemplary heat manifold of an exemplary heat conduction system, according to a preferred embodiment of the present invention, as shown in FIG. 16.

FIG. 17 is a perspective view illustrating an exemplary internal distribution core 1602 of an exemplary heat manifold 1500 of an exemplary heat conduction system 100, according to a preferred embodiment of the present invention, as shown in FIG. 16. Input carbon foam glass/graphene conduit 1610 couples to carbon foam glass/graphene spokes 1606 inside internal distribution core 1602. Rotational fitting 1702 receives crank 1510 to enable rotation. In a particular embodiment, crank 1510 may be automatically controlled and motor driven.

Figure 18:
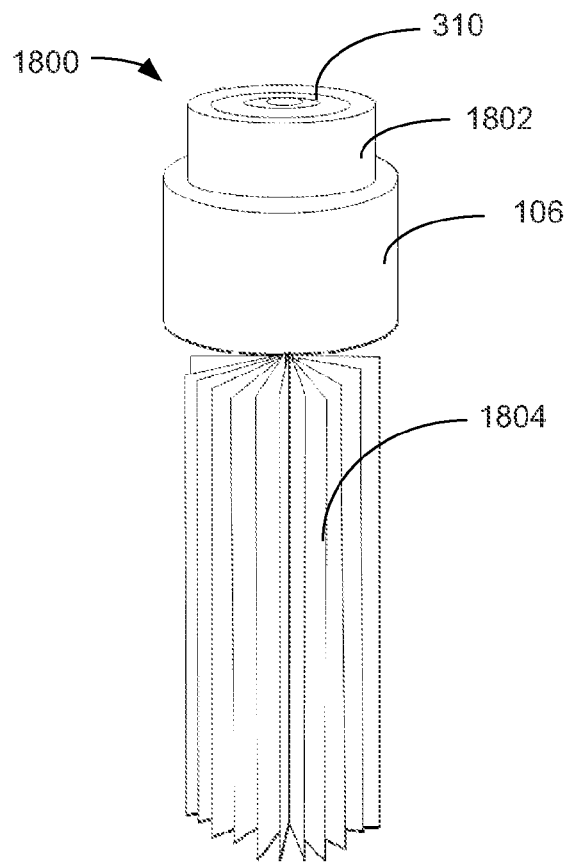
FIG. 18 is a top-side perspective cutaway view of an exemplary alternate embodiment of a down-hole heat exchanger module of an exemplary heat conduction system, according to a preferred embodiment of the present invention.

FIG. 18 is a top-side perspective cutaway view of another exemplary embodiment of a down-hole heat exchanger module 1800 of an exemplary heat conduction system 100, according to a preferred embodiment of the present invention. For installations in which the hot zone 104 environment is not damaging to carbon foam glass/graphene, a finned structure 1804 of carbon foam glass/graphene may protrude from the bottom of the heat conduction string and into the hot zone 104 environment. The additional surface area provided by the finned structure 1804 increases the rate of heat input in the heat conduction system 100. In addition to the well pipe 106, which is the outermost pipe of the well, some wells are equipped with one or more product pipes 1802, which may be more compatible with the product originally brought up from the well than the steel well pipe 106 itself. Because product pipe 1802 reduces the diameter available for carbon foam glass/graphene core 310, careful consideration in installation design should be given to removing the product pipe 1802, selling it for scrap or re-use, and using the increased diameter for increased heat extraction with a larger carbon foam glass/graphene core 310.

Figure 19:
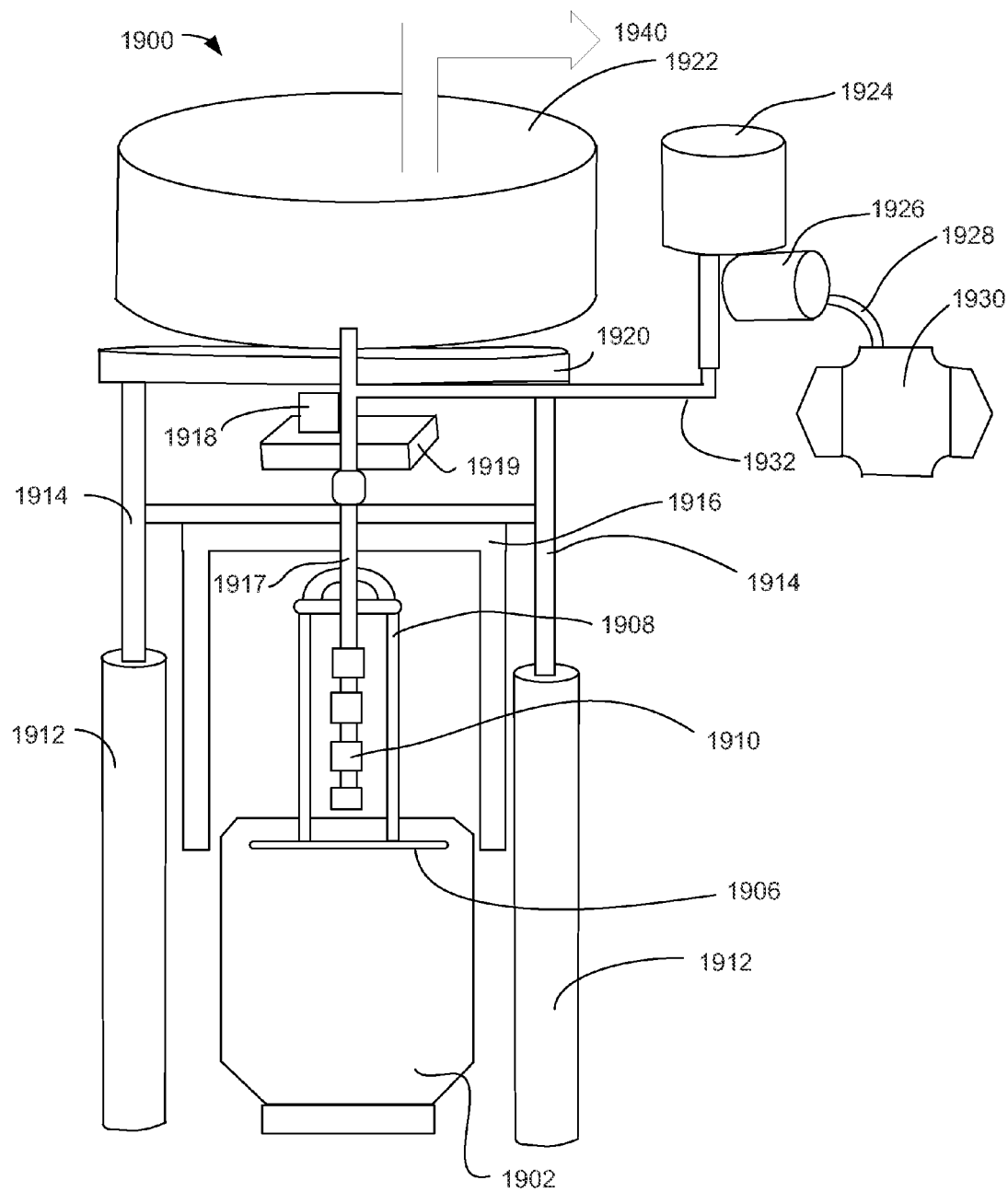
FIG. 19 is a diagrammatic view of an exemplary heat conduction system for removing heat from a slag pot, according to another preferred embodiment of the present invention.

FIG. 19 is a diagrammatic view of an exemplary heat conduction system 1900 for removing heat from a slag pot 1902, according to another preferred embodiment of the present invention. A great deal of heat is used in smelting metals, and much of the heat remains in the slag after smelting. Recovering heat from a slag pot 1902 offers significant savings in the smelting industry.

Slag pot 1902 is filled with molten slag as the process begins. The slag pot 1902 has a ceramic cover 1916 which is raised and lowered by hydraulic pistons 1914 driven by hydraulic cylinders 1912. A granulating disk 1906 is supported by disk support 1908 and rotated by shaft 1917 via magnetic transmission 1919 to granulate the slag while it is being cooled, thereby preventing the slag from solidifying in one solid unmanageable block as it cools. Down-pot heat exchanger 1910, similar to down-hole heat exchanger 600 but with features for high-temperature operation, as discussed above, is lowered into the slag along with granulating disk 1906. Heat is conducted into the down-pot heat exchanger 1910 from the slag and into a heat conduction module string inside shaft 1917. The heat is divided, with some going into rapid thermal charge/discharge unit 1922 and the remainder going, via heat conduction module string 1932 to heat exchanger 1924 which supplies boiler 1926 with heat to provide steam 1928 to turbine 1930. Heat from the rapid thermal charge/discharge unit 1922 may be transferred to high-density thermal storage 1940.

The applications illustrated herein are exemplary. Any system that transfers heat via fluid conduction may be replaced or improved by the present invention. Tapping heat from a volcano may be possible, if the destination can use the heat fast enough to keep the system below thermal deformation temperatures. Tapping waste heat sources is also possible with the present invention, including waste gas burn off from refineries, industrial waste heat contained in turbine exhaust steam or furnace flue gases, solar energy, nuclear reactors (including providing emergency cooling), and the like. Those of skill in the art of thermal engineering, enlightened by the present disclosure, will be aware of the wide variety of applications for the present invention.

We claim:

1. A heat conduction system comprising:
   a. a solid heat conducting core material comprising an ultrasonically blended and subsequently pyrolyzed combination of pitch, coal tar, and graphene and having first and second core ends; and
   b. an outer casing having first and second casing ends enclosing said heat conducting core material, wherein said casing provides thermal conduction access to at least said first and second core ends;
   c. wherein:
      i. said outer casing comprises a thermal valve casing having:
         1. thermal valve input and output channels;
         2. a housing having an upper chamber and a lower chamber; and
         3. couplings at distal ends of said input and output channels, operable to couple to other elements of said heat conduction system;

ii. said housing houses a moveable disc operable to be controllably moved within said upper and lower chambers, wherein said disc comprises a plurality of apertures of various sizes, each operable to be selectively aligned to said input and output channels via said controlled movement of said disc; and
iii. said solid heat conducting core material:
1. extends through each aperture of said plurality of apertures; and
2. extends within said thermal valve input and output channels.

2. The heat conduction system of claim 1, further comprising a coupling on at least one of said first and second casing ends.

3. The heat conduction system of claim 1, further comprising thermally conductive minerals in said pyrolyzed combination.

4. The heat conduction system of claim 1, further comprising an insulating layer between said outer casing and said solid heat conducting core material.

5. The heat conduction system of claim 4, further comprising at least one circumferential spacer between said insulating layer and said solid heat conducting core material.

6. The heat conduction system of claim 5, wherein said at least one circumferential spacer comprises at least two openings for purging with inert gas.

7. The heat conduction system of claim 1, wherein said first and second core ends comprise complementary first and second non-flat surface configurations, respectively.

8. The heat conduction system of claim 1, wherein said outer casing comprises a pipe having pipe couplings at said first and second casing ends and said solid heat conducting core material comprises a cylinder within said pipe.

9. The heat conduction system of claim 1, wherein:
a. said outer casing comprises a down-hole heat exchanger casing having:
 i. a down-hole heat exchanger output channel; and
 ii. a coupling at a top end of said output channel, operable to couple to other elements of said heat conduction system;
b. said solid heat conducting core material comprises at least one of:
 i. said solid heat conducting core material in thermal communication with said outer casing; and
 ii. said solid heat conducting core material extending beyond said outer casing.

10. The heat conduction system of claim 2, comprising a plurality of coupled said outer casings enclosing said solid heat conducting core material, wherein:
a. each said coupled said outer casing enclosing said solid heat conducting core material is configured as one of:
 i. a heat conduction module;
 ii. a pipe break heat conduction module;
 iii. a pipe bend module;
 iv. a heat conduction shut-off valve module;
 v. a heat conduction thermal valve module;
 vi. a heat conduction manifold module;
 vii. an input heat exchanger module; and
 viii. an output heat exchanger module; and
b. said plurality of coupled said outer casings enclosing said solid heat conducting core material is operable to receive an input of heat from a heat source in thermal communication with said input heat exchanger and to conduct said heat to said output heat exchanger.

11. The heat conduction system of claim 10, wherein said heat source in thermal communication with said input heat exchanger module is at least one of:

a. geothermal;
b. hot slag;
c. industrial waste heat;
d. solar; and
e. a nuclear reactor.

12. A heat conduction system comprising:
a. a solid heat conducting core material comprising an ultrasonically blended and subsequently pyrolyzed combination of pitch, coal tar, and graphene and having first and second core ends; and
b. an outer casing having first and second casing ends enclosing said heat conducting core material, wherein said casing provides thermal conduction access to at least said first and second core ends; and
c. a coupling on at least one of said first and second casing ends;
d. wherein:
 i. said outer casing comprises a thermal valve casing having:
  1. thermal valve input and output channels;
  2. a housing having an upper chamber and a lower chamber; and
  3. couplings at distal ends of said input and output channels, operable to couple to other elements of said heat conduction system;
 ii. said housing houses a moveable disc operable to be controllably moved within said upper and lower chambers, wherein said disc comprises a plurality of apertures of various sizes, each operable to be selectively aligned to said input and output channels via said controlled movement of said disc; and
 iii. said solid heat conducting core material:
  1. extends through each aperture of said plurality of apertures; and
  2. extends within said thermal valve input and output channels.

13. The heat conduction system of claim 12, further comprising thermally conductive minerals in said pyrolyzed combination.

14. The heat conduction system of claim 12, further comprising:
a. an insulating layer between said outer casing and said solid heat conducting core material;
b. at least one circumferential spacer between said insulating layer and said solid heat conducting core material;
c. at least two openings in said at least one circumferential spacer for purging with inert gas; and
d. wherein said first and second core ends comprise complementary first and second non-flat surface configurations, respectively.

15. The heat conduction system of claim 12, further comprising one of:
a. said solid heat conducting core material in thermal communication with said outer casing; and
b. said solid heat conducting core material extending outside of said outer casing.

16. The heat conduction system of claim 12, comprising a plurality of coupled modules, wherein each module of said plurality of coupled modules comprises said outer casing enclosing said solid heat conducting core material, wherein:
a. each said module of said plurality of coupled modules is configured as one of:
 i. a heat conduction module;
 ii. a pipe break heat conduction module;
 iii. a pipe bend module;
 iv. a heat conduction shut-off valve module;
 v. a heat conduction thermal valve module;

vi. a heat conduction manifold module;
vii. an input heat exchanger module; and
viii. an output heat exchanger module; and
b. said plurality of coupled modules is operable to receive an input of heat from a heat source in thermal communication with said input heat exchanger and to conduct said heat to said output heat exchanger.

17. The heat conduction system of claim 16, wherein said heat source in thermal communication with said input heat exchanger module is at least one of:
a. geothermal;
b. hot slag;
c. industrial waste heat;
d. solar; and
e. a nuclear reactor.

18. A heat conduction system comprising:
a. a solid heat conducting core material comprising an ultrasonically blended and subsequently pyrolyzed combination of pitch, coal tar, and graphene and having first and second core ends; and
b. an outer casing having first and second casing ends enclosing said heat conducting core material, wherein said casing provides thermal conduction access to at least said first and second core ends; and
c. a coupling on at least one of said first and second casing ends;
d. further comprising at least one of:
   i. a heat conducting module comprising:
      1. an insulating layer between said outer casing and said solid heat conducting core material;
      2. at least one circumferential spacer between said insulating layer and said solid heat conducting core material;
      3. at least two openings in said at least one circumferential spacer for purging with inert gas; and
      4. wherein said first and second core ends comprise complementary first and second non-flat surface configurations, respectively; and
   ii. a heat exchanger module further comprising one of:
      1. said solid heat conducting core material in direct thermal communication with said outer casing; and
      2. said solid heat conducting core material extending outside of said outer casing;
e. wherein:
   i. said outer casing comprises a thermal valve casing having:
      1. thermal valve input and output channels;
      2. a housing having an upper chamber and a lower chamber; and
      3. couplings at distal ends of said input and output channels, operable to couple to other elements of said heat conduction system;
   ii. said housing houses a moveable disc operable to be controllably moved within said upper and lower chambers, wherein said disc comprises a plurality of apertures of various sizes, each operable to be selectively aligned to said input and output channels via said controlled movement of said disc; and
   iii. said solid heat conducting core material:
      1. extends through each aperture of said plurality of apertures; and
      2. extends within said thermal valve input and output channels.

19. The heat conduction system of claim 18, further comprising thermally conductive minerals in said pyrolyzed combination.

20. The heat conduction system of claim 18, comprising a plurality of coupled modules, each module of said plurality of coupled modules comprising said outer casing enclosing said solid heat conducting core material, wherein:
e. each said module of said plurality of coupled modules is configured as one of:
   i. a heat conduction module;
   ii. a pipe break heat conduction module;
   iii. a pipe bend module;
   iv. a heat conduction shut-off valve module;
   v. a heat conduction thermal valve module;
   vi. a heat conduction manifold module;
   vii. an input heat exchanger module; and
   viii. an output heat exchanger module;
f. said plurality of said coupled modules is operable to receive an input of heat from a heat source in thermal communication with said input heat exchanger and to conduct said heat to said output heat exchanger; and
g. wherein said heat source comprises at least one of:
   i. geothermal;
   ii. hot slag;
   iii. industrial waste heat;
   iv. solar; and
   v. a nuclear reactor.

\* \* \* \* \*